(12) United States Patent
Shioya et al.

(10) Patent No.: US 7,964,317 B2
(45) Date of Patent: *Jun. 21, 2011

(54) VALVE HAVING VALVE ELEMENT DISPLACED BY AT LEAST ONE OF A MOVEMENT OF A DIAPHRAGM AND A MOVEMENT OF AN ACTUATOR, AND FUEL CELL USING THE VALVE

(75) Inventors: Shunsuke Shioya, Yokohama (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,249

(22) Filed: Aug. 6, 2010

(65) Prior Publication Data

US 2010/0304263 A1 Dec. 2, 2010

Related U.S. Application Data

(62) Division of application No. 11/094,135, filed on Mar. 31, 2005, now Pat. No. 7,790,325.

(30) Foreign Application Priority Data

Mar. 31, 2004 (JP) .................................. 2004-106681

(51) Int. Cl.
  *H01M 8/04* (2006.01)
  *F16K 15/14* (2006.01)
(52) U.S. Cl. ...................... 429/444; 429/512; 251/331
(58) Field of Classification Search ................... 429/444, 429/512; 251/331
  See application file for complete search history.

(56) References Cited

U.S. PATENT DOCUMENTS

| | | | |
|---|---|---|---|
| 3,974,844 | A | 8/1976 | Pimentel |
| 4,943,032 | A | 7/1990 | Zdeblick |
| 5,092,360 | A | 3/1992 | Watanabe et al. |
| 5,325,880 | A | 7/1994 | Johnson et al. |
| 5,593,134 | A | 1/1997 | Steber et al. |
| 5,839,467 | A | 11/1998 | Saaski et al. |
| 6,116,576 | A | 9/2000 | Hoeglund et al. |
| 6,706,439 | B2 | 3/2004 | Herrmann |
| 6,709,604 | B2 | 3/2004 | Tai et al. |
| 7,790,325 | B2 * | 9/2010 | Shioya et al. ............. 429/444 |
| 2002/0176804 | A1 | 11/2002 | Strand et al. |

(Continued)

FOREIGN PATENT DOCUMENTS

JP  1-213523 A  8/1989

(Continued)

*Primary Examiner* — Stephen J. Kalafut
(74) *Attorney, Agent, or Firm* — Fitzpatrick, Cella, Harper & Scinto (57) ABSTRACT

A valve and a fuel cell using the same are provided, the valve having a fluid inlet, a fluid outlet, a flow path communicating therebetween, a valve element provided in the flow path, a diaphragm which is disposed so as to separate the inside from the outside of the flow path and which is to be deformed by the difference in pressure between the inside and the outside of the flow path, a valve shaft connecting between the valve element and the diaphragm, and an actuator provided for the diaphragm. In the valve described above, the valve element is displaced by at least one movement of the diaphragm and the actuator to open and close the valve. Accordingly, the valve has a simple structure which can be easily miniaturized and which is unlikely to be degraded even when a corrosive fluid flows through the valve.

19 Claims, 11 Drawing Sheets

U.S. PATENT DOCUMENTS

| | | |
|---|---|---|
| 2003/0002995 A1 | 1/2003 | Urano et al. |
| 2004/0206409 A1 | 10/2004 | Yano et al. |
| 2006/0141303 A1 | 6/2006 | Mogi et al. |
| 2007/0026269 A1 | 2/2007 | Nakakubo |
| 2007/0077477 A1 | 4/2007 | Mogi et al. |

FOREIGN PATENT DOCUMENTS

| | | | |
|---|---|---|---|
| JP | 3-272373 | A | 12/1991 |
| JP | 5-141565 | A | 6/1993 |
| JP | 8-085436 | A | 4/1996 |
| JP | 2001-304440 | A | 10/2001 |
| JP | 2002-373682 | A | 12/2002 |
| JP | 2003-013861 | A | 1/2003 |
| JP | 2004-316835 | A | 11/2004 |

\* cited by examiner

VALVE HAVING VALVE ELEMENT DISPLACED BY AT LEAST ONE OF A MOVEMENT OF A DIAPHRAGM AND A MOVEMENT OF AN ACTUATOR, AND FUEL CELL USING THE VALVE

CROSS-REFERENCE TO RELATED APPLICATIONS

This application is a division of application Ser. No. 11/094,135, filed Mar. 31, 2005, now U.S. Pat. No. 7,790,325, which claims benefit from Japanese Patent Application No. 2004-106681, filed Mar. 31, 2004. Both prior applications are incorporated herein by reference.

BACKGROUND OF THE INVENTION

1. Field of the Invention

The present invention relates to a valve and a fuel cell using the same, and more particularly, relates to an ON-OFF valve having a pressure regulation mechanism and a fuel cell using the same.

2. Description of the Related Art

In recent years, environmental destruction has become a serious problem, and hence clean energy producing no harmful waste has been pursued. In addition, the depletion of fossil fuel has also become a problem, and new energy has been actively pursued. In electronic fields, concomitant with an increase of information, information processing capability has been significantly improved, and as a result, power consumption of electronic devices tends to increase.

Accordingly, as an energy source, attention has been paid to hydrogen which is contained in water exhaustlessly present on the globe, which has high chemical energy, and which produces no harmful waste. In particular, in a fuel cell which directly generates electrical energy, since hydrogen is efficiently used, and a large amount of electricity is generated, the fuel cell has been progressively applied to various fields, for example, including automobiles and portable electronic devices, such as a notebook personal computer, a mobile phone, and a video camera.

The fuel cell described above which generates electrical energy using hydrogen has a hydrogen electrode to which hydrogen is supplied and an oxidation electrode to which oxygen is supplied. In this fuel cell, hydrogen molecules are each separated into an electron and a proton by catalytic reaction on the hydrogen electrode, and the protons thus generated are allowed to pass through an electrolyte membrane and reach the oxidation electrode so as to form water by catalytic reaction with oxide molecules, thereby generating the flow of electrons, that is, electricity, in the process described above.

Unlike related cells, in fuel cells, charging is not required, and when a fuel is run out, electricity can be immediately generated only by refilling a fuel and can be advantageously used for operating a device for a long time.

Among the fuel cells described above, when attention is particularly paid to a small fuel cell used in a portable electrical device, since the amount of energy per volume and per weight generated by this type of fuel cell is several to approximately ten times that of a related fuel cell such as a lithium secondary fuel cell, an electrical device can be continuously operated for a longer time. Hence, in the field of the small fuel cell, research and development on the practical use thereof has been aggressively carried out.

As the small fuel cell described above, a direct methanol fuel cell (DMFC) using methanol as a fuel and a proton-exchange membrane fuel cell (PEFC) directly using hydrogen as a fuel have been developed and experimentally manufactured. In the former DMFC, problems, such as a crossover phenomenon in which methanol used as a fuel passes through a polymer electrolyte membrane and directly reacts with oxygen at an oxidation electrode side, and a poisoning phenomenon in which carbon monoxide generated through reaction poisons an electrode catalysis, may arise, and as a result, a fuel cell having a small output density can only be formed as compared to that obtained by the PEFC. On the other hand, advantageously, the latter PEFC can generate a larger amount of electricity and can only produce water without any byproducts; however, since hydrogen in the gas form is used, when the PEFC is used as a small fuel cell for a portable device, a handling technique of the cell becomes important.

In the PEFC using hydrogen as a direct fuel, as means for storing hydrogen, a hydrogen absorbing alloy having a large absorption capacity on a volume basis has been suitably used. However, when $LaNi_5$ is used as a hydrogen absorbing alloy by way of example, since the pressure inside a hydrogen storage container becomes approximately 0.3 to 0.4 MPa at around room temperature, in order to prevent breakage of an electrolyte membrane which is caused by the difference in pressure, the pressure described above must be decreased to that at the oxidation electrode side, that is, approximately atmospheric pressure, when hydrogen is supplied into the fuel cell. In addition, for example, in the case in which the small fuel cell is not used for a long period of time, the output thereof may be decreased in some cases due to air entering the hydrogen electrode side, and hence a mechanism for purging the hydrogen electrode side with a pure hydrogen gas must be provided.

Furthermore, in addition to the fuel cell described above, in a system for regulating the flow of a fluid (including a liquid besides a gas), in general, a pressure regulation mechanism and an ON-OFF valve, such as an electromagnetic valve, functioning to open and close a flow path must be provided therein in some cases. In this case, since an element of regulating the pressure and an element of opening and closing the valve must be provided independently, a compact flow path cannot be freely designed due to the limitation described above.

Of course, miniaturization of a valve is very important for the small fuel cell described above, and in addition, for example, when a flow path is formed in a minute space as is the case of a microreactor which is believed to contribute the development of industries, the miniaturization described above is essentially required. When the valve is miniaturized, it is particularly important to form a compact flow path in a predetermined space.

Figure 13:
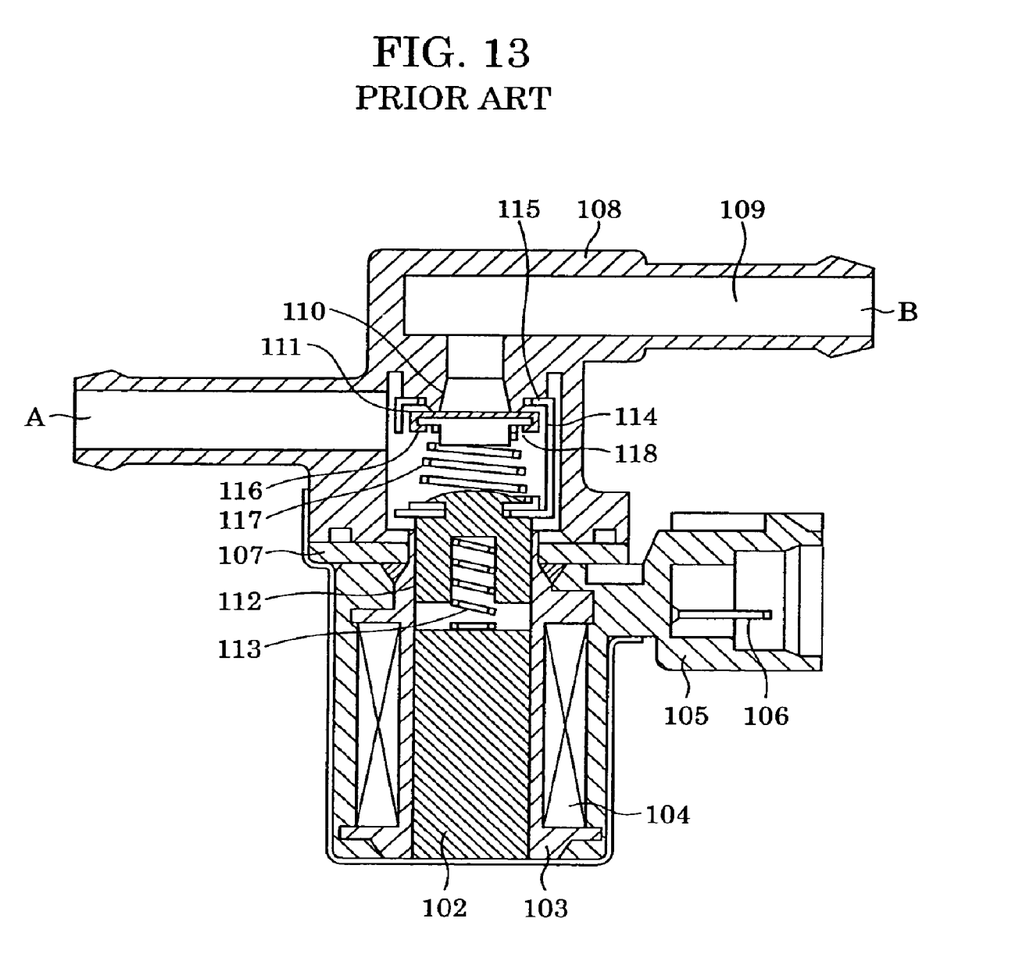
FIG. 13 is a schematic view showing an ON-OFF valve provided with a related pressure regulation mechanism.

A technique of solving the problem described above has been disclosed in Japanese Patent Laid-Open No. 05-141565, and in FIG. 13, reference numerals 102, 103, 104, 105, 106, 107, 108, 109, 110, and 111 indicate a stator, bobbin, coil, connector, terminal, auxiliary magnetic pole, body, fluid flow path, sheet portion, and step portion, respectively; reference numerals 114, 115, and 116 indicate a retainer, opening, and valve body, respectively; and reference numeral 118 indicates a check valve. As shown in FIG. 13, an electromagnetic valve has been disclosed in which, by using a spring 113 having a strong urging force for controlling a plunger 112 and a spring 117 having a weak urging force so that a check valve can be operated only by the difference in pressure between the upstream and the downstream sides of the check valve, the pressure regulation and the ON-OFF operation of the check valve can both be performed and in which the difference in pressure can be regulated by opening the check valve in accordance with the difference in pressure in the flow path when electricity is not supplied.

In addition, as a microvalve, ON-OFF valves have been disclosed, for example, in Japanese Patent Laid-Open Nos. 01-2135235 and 2001-304440 and U.S. Pat. No. 5,325,880.

However, in the related technique disclosed in Japanese Patent Laid-Open No. 05-141565, since the spring is used as an elastic body, and an actuator is provided in the valve, the structure thereof becomes complicated and is difficult to be miniaturized. In addition, according to the structure described above, since the spring 117 is directly brought into contact with a fluid, when a corrosive fluid is used, the spring 117 may be degraded in some cases.

In addition, according to Japanese Patent Laid-Open Nos. 01-213523 and 2001-304440 and U.S. Pat. No. 5,325,880, as the microvalve, the ON-OFF valve has been disclosed, however, the pressure regulation mechanism has not be disclosed. When the ON-OFF valve and the pressure regulation mechanism are both disposed in the flow path independently, the size of the whole flow path is increased, and as a result, the miniaturization thereof has a limitation.

SUMMARY OF THE INVENTION

Accordingly, the present invention provides a valve and a fuel cell using the same, the valve having a simple structure which can be easily miniaturized and having a pressure regulation mechanism which is unlikely to be degraded even when a corrosive fluid is allowed to flow therethrough.

That is, the present invention provides a valve having a fluid inlet, a fluid outlet, a fluid flow path communicating between the inlet and the outlet, a valve element provided in the fluid flow path, a diaphragm which is disposed so as to separate the inside of the fluid flow path from the outside thereof and which is to be deformed by the difference in pressure between the inside of the fluid flow path and the outside thereof, a valve shaft connecting between the valve element and the diaphragm, and an actuator provided for the diaphragm. Specifically, the diaphragm may be disposed on a side of the fluid outlet of the fluid flow path as viewed from the valve element and may be deformed by the difference in pressure between the inside and outside of the fluid flow path in the direction of the difference in pressure. In this valve described above, the valve element is displaced by at least one movement of the diaphragm and the actuator so as to open and close the valve.

In the valve described above, the actuator can be provided for the diaphragm at the outside of the flow path.

In addition, the actuator can comprise at least one of a piezoelectric material, a shape-memory alloy, a thermal expansion material, and an electromagnet.

Furthermore, the diaphragm can comprise at least one of a metal, a nonmetallic material, and a semiconductor material.

In addition, the present invention provides a fuel cell comprising a hydrogen storage room, a hydrogen electrode room, and a valve which is provided between the hydrogen storage container and the hydrogen electrode room and which has a hydrogen flow path communicating therebetween. In the case described above, the fluid flow path of the valve described above is the above hydrogen flow path.

In the fuel cell described above, the outside of the hydrogen flow path is atmosphere. According to the present invention, since the actuator is in contact with the outside of the valve, the structure approximately equivalent to that of a diaphragm type pressure regulation mechanism can be formed and hence can be simplified, so that the miniaturization of the valve can be easily achieved. In addition, since the actuator is not to be directly brought into contact with the fluid, and the diaphragm is used as an elastic body, a material can be freely selected as compared to the case in which the spring is used, and as a result, even when a corrosive fluid is allowed to flow, a valve which is unlikely to be degraded can be formed.

The present invention can provide a valve which can be passively opened and closed for pressure regulation only by using the difference in pressure and which can also be forcedly opened by the actuator. In addition, according to the valve described above of the present invention, since the structure thereof is simple, the miniaturization can be easily performed, the size of the flow path through which a fluid flows can be decreased, and the pressure regulation mechanism unlikely to be degraded can be obtained even when a corrosive fluid is allowed to flow.

In addition, the present invention can provide a fuel cell using the valve described above.

Further features and advantages of the present invention will become apparent from the following description of exemplary embodiments with reference to the attached drawings.

DESCRIPTION OF THE EMBODIMENTS

A valve of the present invention has a fluid inlet, a fluid outlet, a fluid flow path communicating between the inlet and the outlet, a valve element provided in the fluid flow path, a diaphragm which is disposed so as to separate the inside of the fluid flow path from the outside thereof and which is to be deformed by the difference in pressure between the inside of the fluid flow path and the outside thereof, a valve shaft connecting between the valve element and the diaphragm, and actuators provided for the diaphragm.

In addition, the actuators can be provided for the diaphragm at the outside of the fluid flow path.

Hereinafter, the embodiments of the present invention will be described. However, the present invention is not limited to the following description, and various changes and modifications may be made without departing from the spirit and the scope of the present invention.

Figure 1:
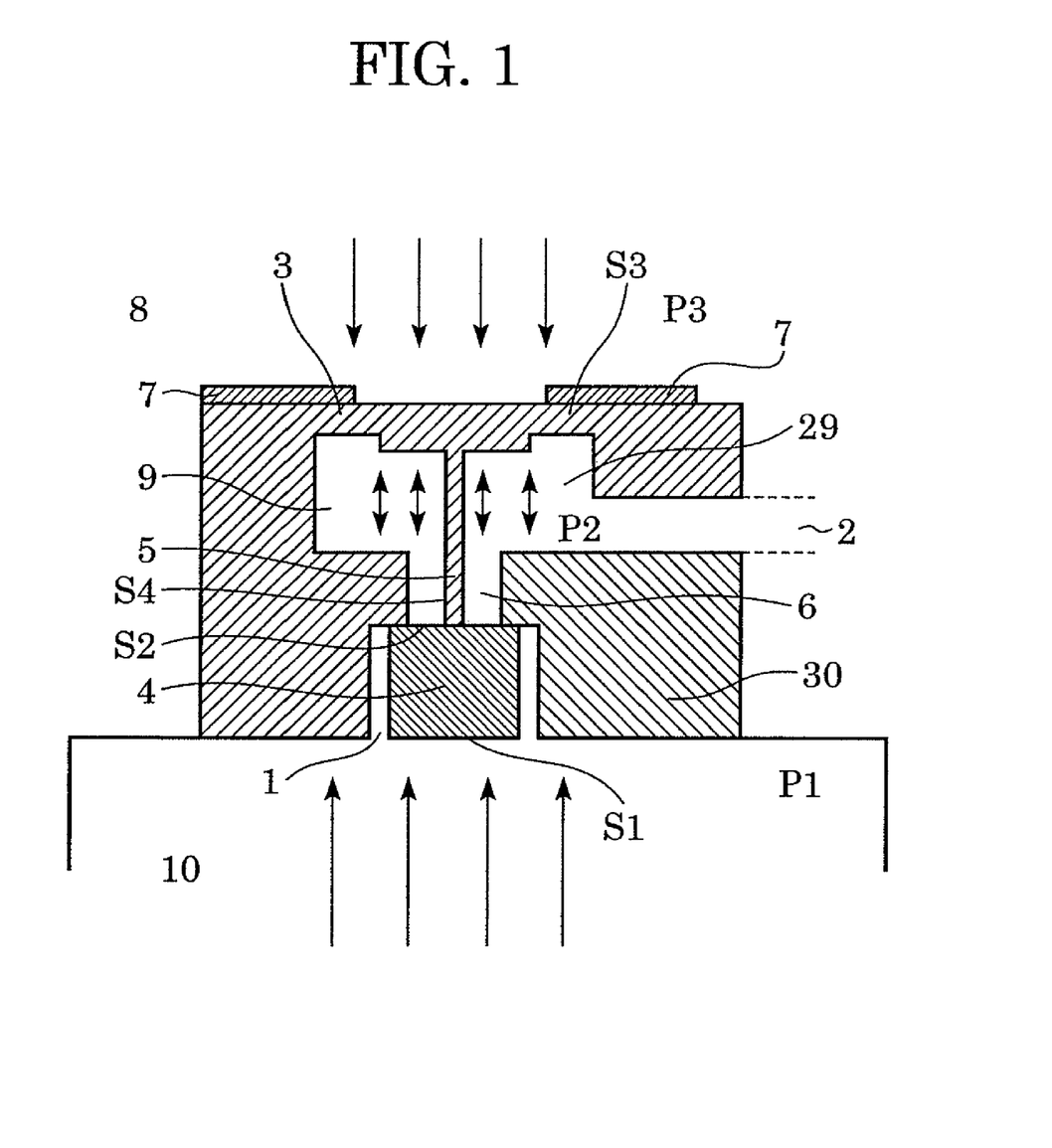
FIG. 1 is a cross-sectional view showing a valve of an embodiment according to the present invention.
Figure 2:
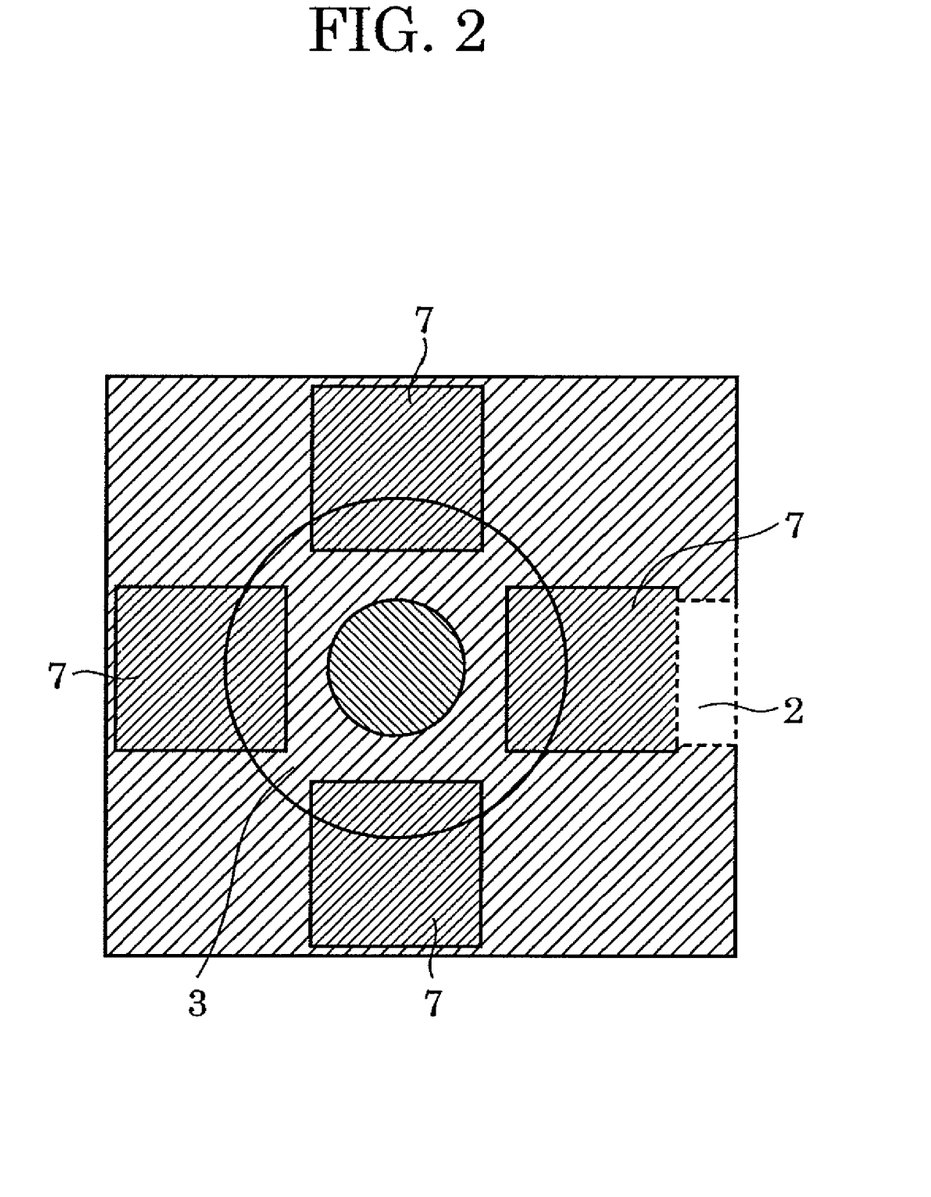
FIG. 2 is a plan view showing the valve shown in FIG. 1.

FIG. 1 is a cross-sectional view of a valve of one embodiment according to the present invention, and FIG. 2 is a plan view of the valve shown in FIG. 1. The valve shown in the figures has a fluid inlet 1, a fluid outlet 2, a diaphragm 3, a valve element 4, a valve shaft 5 directly connecting between the diaphragm 3 and the valve element 4, a shaft hole 6 through which a fluid flows, and actuators 7 which move the diaphragm 3 up and down. The diaphragm 3 is in contact with an outside space 8 and a space 9, and the valve element 4 is present between the space 9 and a space 10 and is provided so as to close a fluid flow path 29 in a closed state.

Hereinafter, ON-OFF operation of the valve will be described. In the following description on the principle of the operation, in order to facilitate the understanding of the description of present invention, the weights of the valve shaft 5 and the valve element 4 are ignored. FIG. 1 shows the state in which the pressure in the space 9 is high and in which the valve is closed since the diaphragm 3 is not bent downward. In this case, when the pressure of the space 10 is represented by $P_1$ [N/m$^2$], the pressure of the space 9 is represented by $P_2$ [N/m$^2$], the pressure of the outside space 8 is represented by $P_3$ [N/m$^2$], the area of the valve element 4 is represented by $S_1$ [m$^3$], the area of a part of the valve element 4 which is not in contact with a valve sheet 30 at the space 9 side is represented by $S_2$ [m$^3$], the area of a diaphragm portion is represented by $S_3$ [m$^3$], and the cross-sectional area of the valve shaft 5 is represented by $S_4$ [m$^3$], the following equation (1) holds.

$$(P_1 \times S_1) + \{P_2 \times (S_3 - S_4)\} > \{P_2 \times (S_2 - S_4)\} + (P_3 \times S_3) \quad (1)$$

Figure 3:
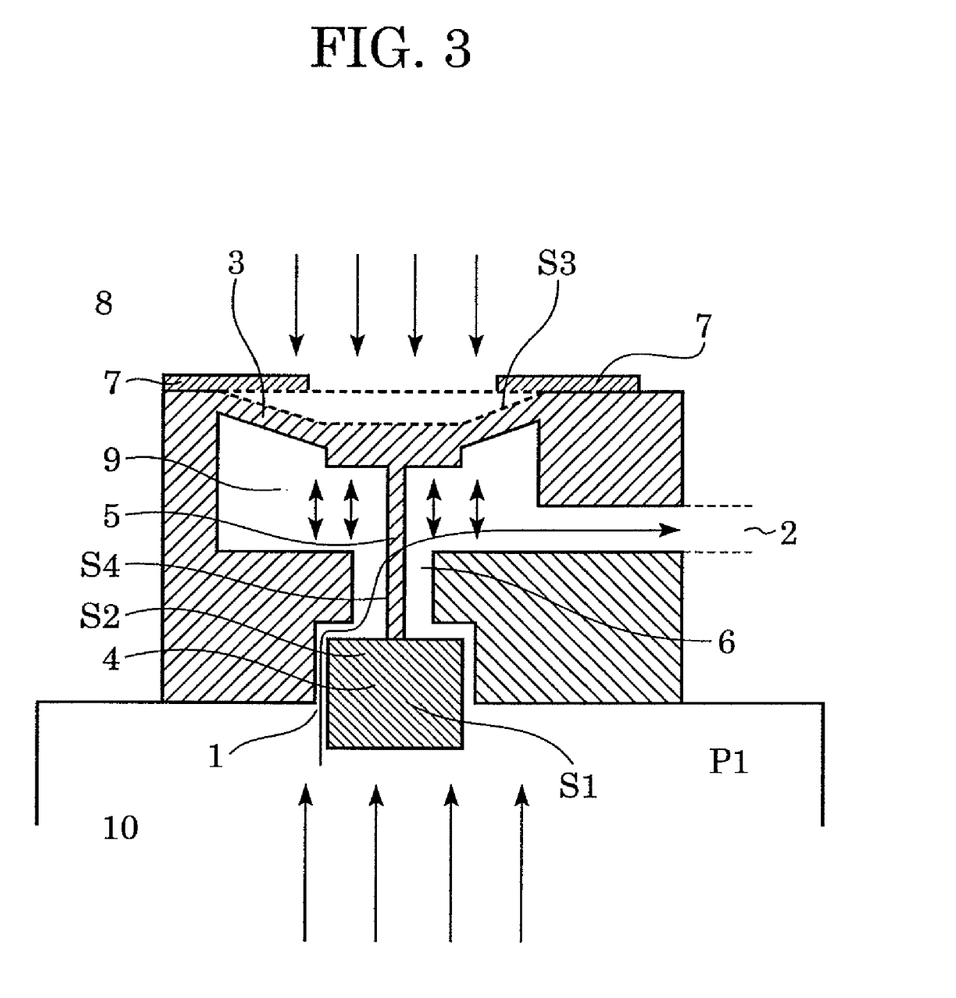
FIG. 3 is a cross-sectional view showing a valve of another embodiment according to the present invention.

FIG. 3 shows the state in which the pressure $P_2$ of the space 9 is low and in which the valve is opened. In the case in which the spring constant of the diaphragm 3 is represented by k [N/m], and in which the valve element 4 is located at a position lower than the state shown in FIG. 1 by x [m], the power relationship in this case can be represented by the following equation (2). In the case described above, since being small, the difference in pressure between the space 9 and the shaft hole 6 is ignored; however, when this difference in pressure becomes large so as not to be ignored, the power relationship must be reconsidered.

$$(P_1 \times S_1) + \{P_2 \times (S_3 - S_4)\} + kx > \{P_2 \times (S_1 - S_4)\} + (P_3 \times S_3) \quad (2)$$

In the state shown in FIG. 3, the fluid in the space 10 is supplied into the space 9; however, after a predetermined time elapses, the pressure of the space 9 is increased so that the equation (1) holds, and the valve is closed, so that the state shown in FIG. 1 is again obtained.

Figure 4:
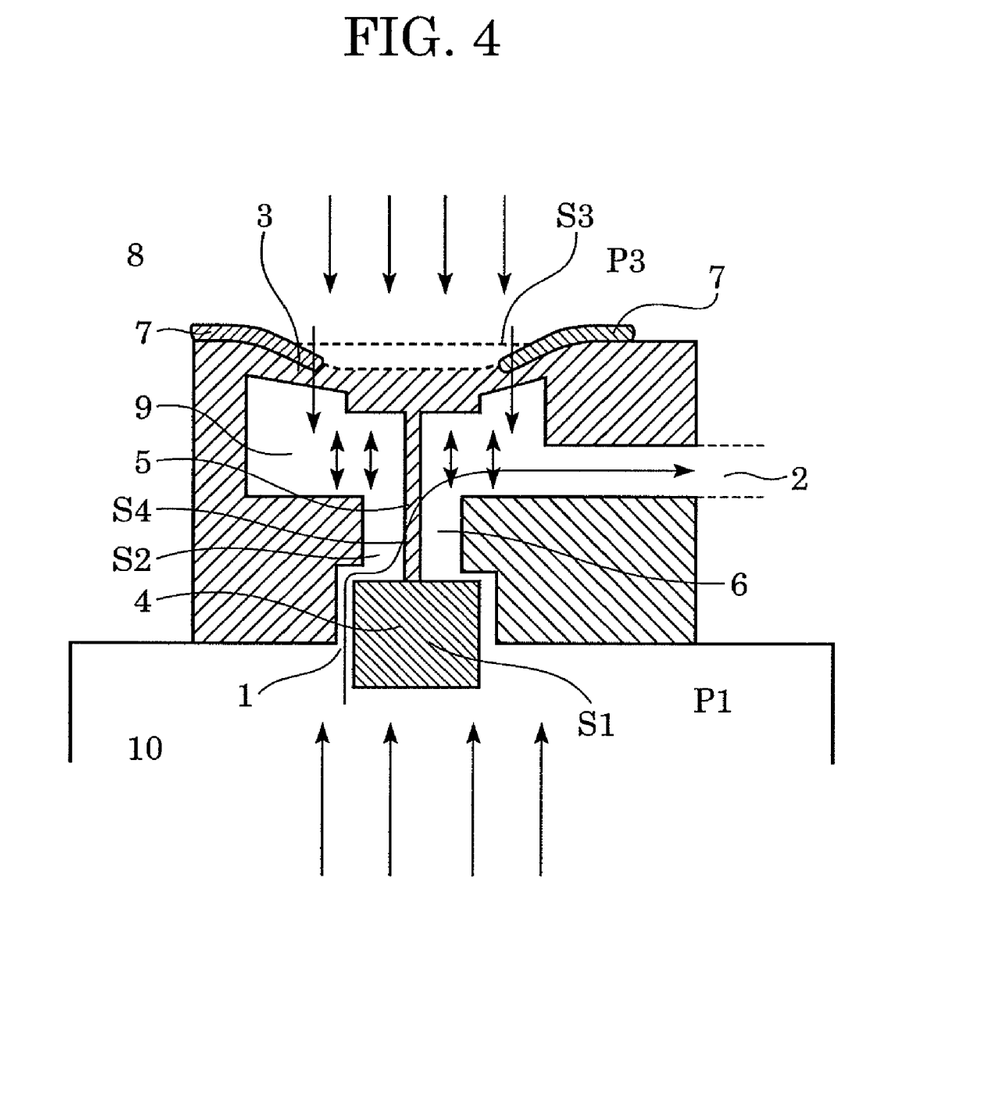
FIG. 4 is a cross-sectional view showing a valve of another embodiment according to the present invention.

FIG. 4 shows the state in which the pressure of the space 9 is high and in which the equation (1) holds; however, by the actuators 7, the valve is actively opened. In this case, a force F [N] required to open the valve is represented by equation (3) when the valve element 4 is lowered by x [m] than the state shown in FIG. 1.

$$F = [(P_1 \times S_1) + \{P_2 \times (S_3 - S_4)\} + kx] - \{P_2 \times (S_1 - S_4)\} + (P_3 \times S_3) \quad (3)$$

In this case, a material for the diaphragm 3, the thickness thereof, and/or the force generated by the actuator 7 can be optionally determined by the relationship among the pressures $P_1$, $P_2$, and $P_3$, and the relationship among the areas $S_1$, $S_2$, $S_3$ and $S_4$.

As the materials for the diaphragm 3, for example, there may be mentioned metals, such as stainless steel, beryllium, Hastelloy, Kanthal, brass, aluminum, and phosphor bronze; nonmetallic materials such as silicone rubber, fluorinated rubber, acrylonitrile butadiene rubber (NBR), ethylene-propylene terpolymer rubber (EPT), and urethane rubber; and semiconductor materials such as silicon.

Figure 5:
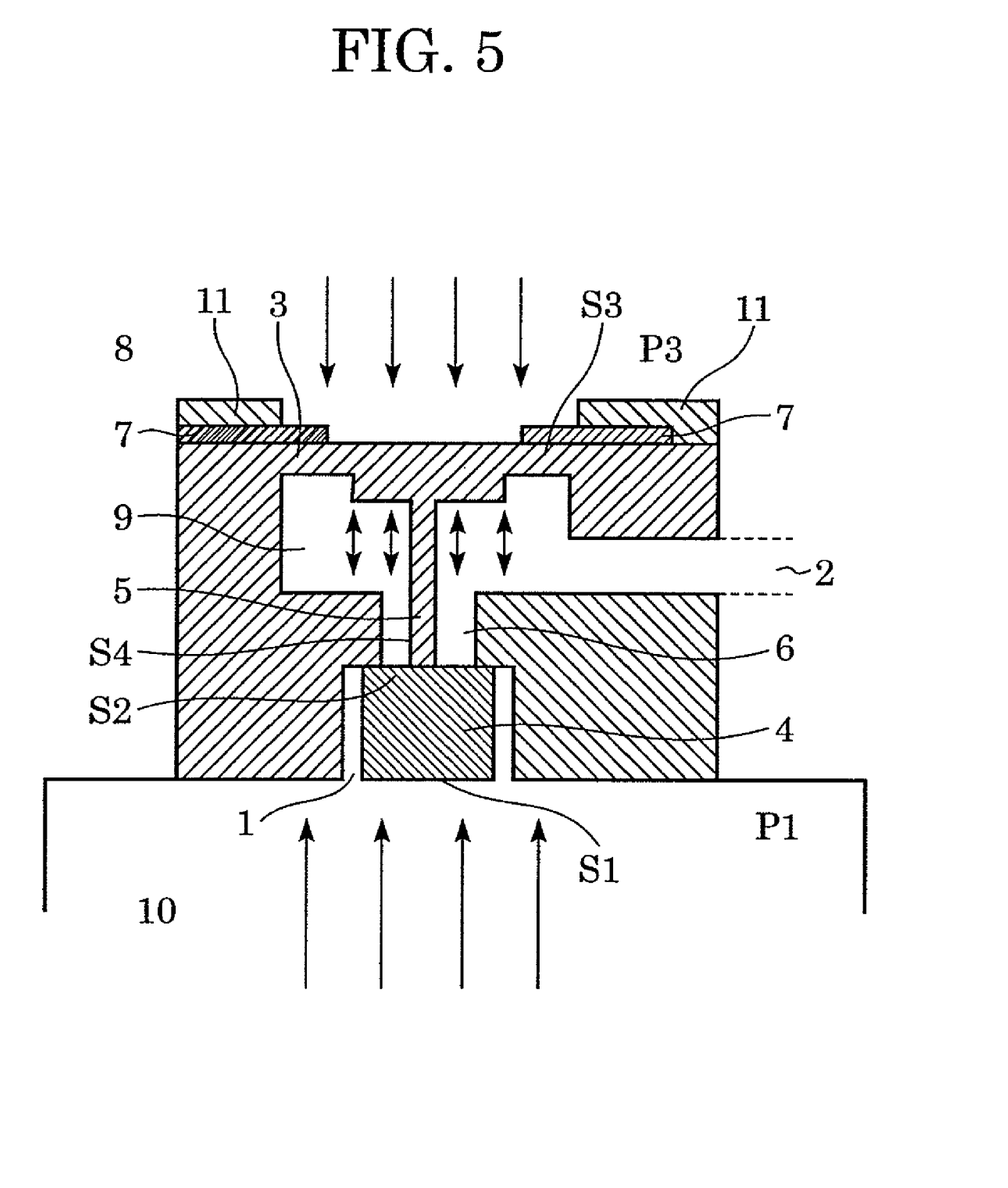
FIG. 5 is a cross-sectional view showing a valve of an embodiment according to the present invention, in which actuators are fixed on the valve with a cover.
Figure 6:
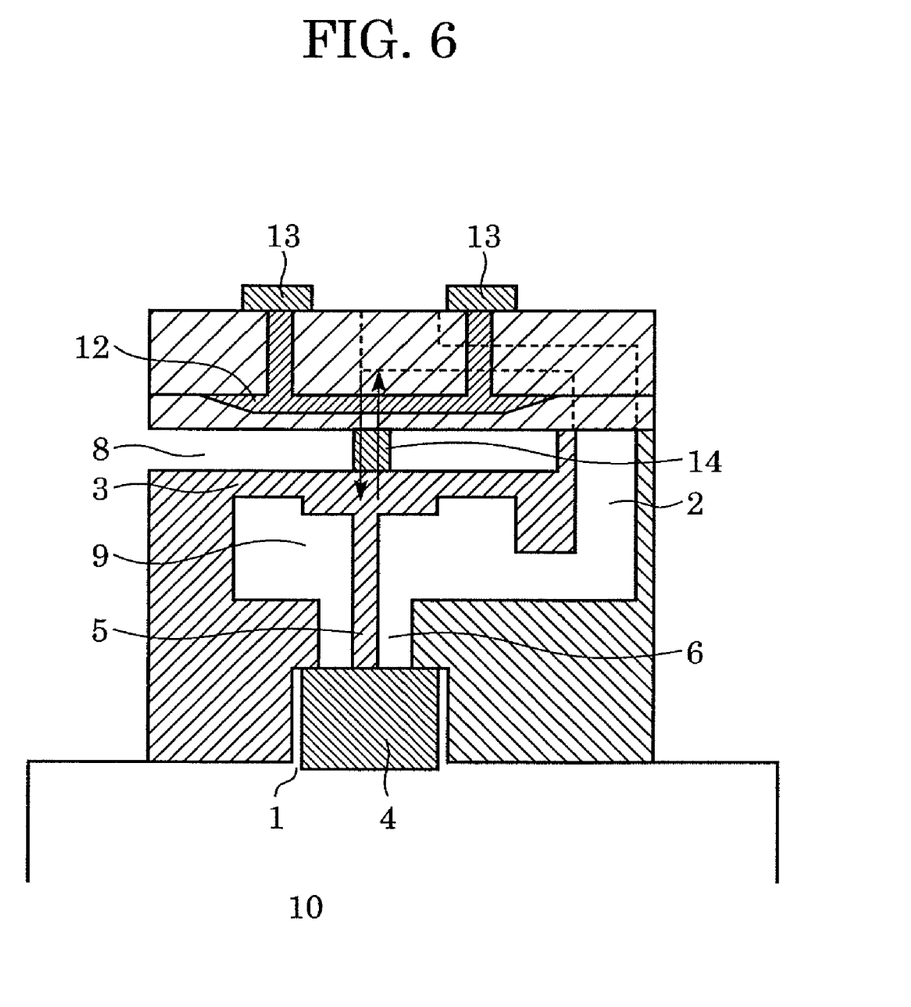
FIG. 6 is a cross-sectional view showing a valve of an embodiment according to the present invention, in which a thermal expansion material is used as an actuator for the valve.
Figure 7:
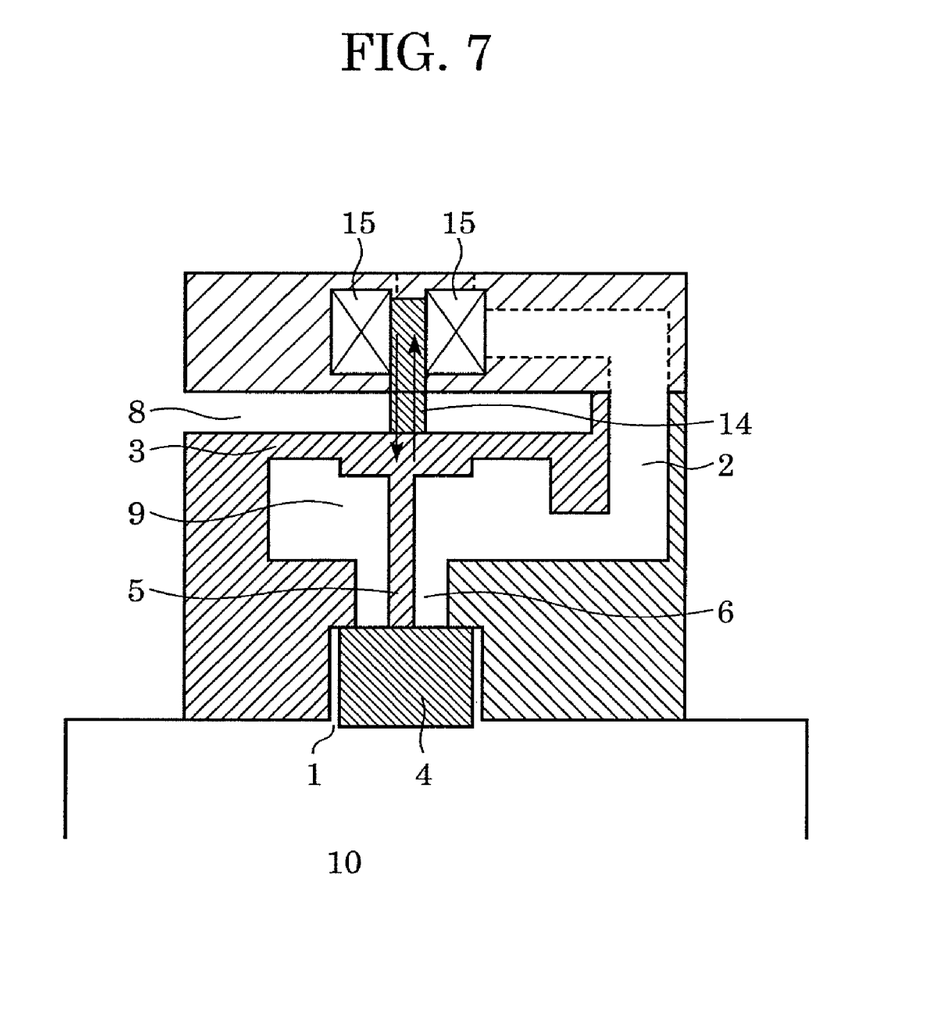
FIG. 7 is a cross-sectional view showing a valve of an embodiment according to the present invention, in which an electromagnetic force is used as an actuator for the valve.

In addition, for the actuator 7, for example, a piezoelectric material such as PZT, a shape-memory alloy such as a Ti—Ni base alloy, a thermal expansion material, and an electromagnet may be used. The material for the actuator 7 may be optionally selected in consideration of a force to be generated or a required response speed. As a method for mounting the actuator 7, when the generative force is small, a thin film may be directly formed on the valve, and when the element is large, the actuator 7 may be adhered to a part of the valve which is not in contact with the diaphragm using an adhesive, or as shown in FIG. 5, the actuator 7 may be mounted using a cover 11 provided thereover. In addition to the case in which the actuator 7 in the form of a plate is used as shown in FIGS. 1 and 2, an actuator mechanism may be independently provided. For example, a liquid or a solid material, the volume of which is expanded by applying heat using a heater or the like, may be used as a thermal expansion material 12 as shown in FIG. 6, and as shown in FIG. 7, an electromagnetic force may also be used. In FIG. 6 reference numerals 13 and 14 indicate a lid and a bar, respectively, and in FIG. 7, reference numeral 15 indicates a coil. According to the structures as described above, the volume of the valve itself is increased as compared to that of the structure shown in FIG. 1; however, an actuator portion can be more easily designed, and as a result, the type of actuator 7 and the generative force thereof can be more optionally selected.

Figure 8:
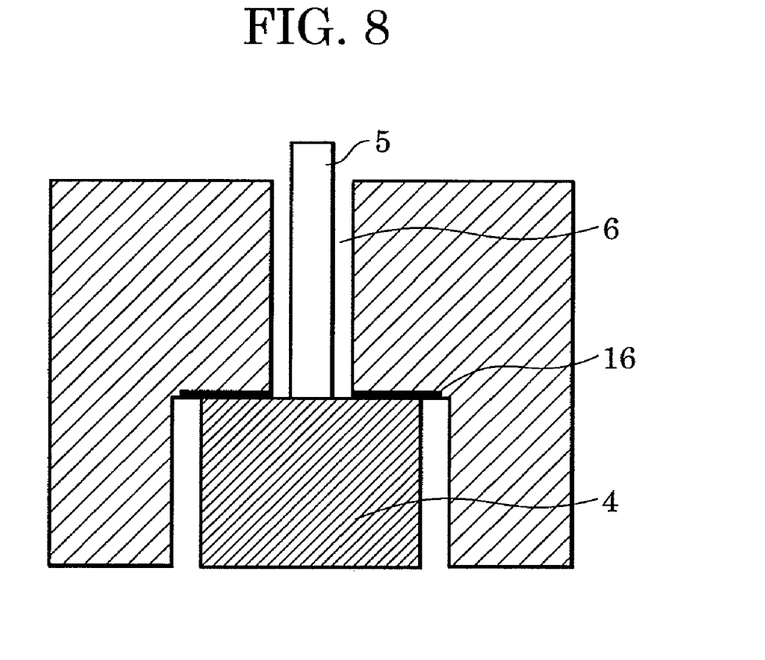
FIG. 8 is a view for illustrating the state in which at least one surface of a flow path of a valve according to the present invention is coated with a sealing material.

In addition, in this embodiment, in order to prevent leakage from the space 9 to the space 10, at least one surface of the valve or the flow path at a place at which the valve element 4 blocks the flow path can be coated with a sealing material 16 made, for example, of silicone rubber, fluorinated rubber, NBR, EPT, or urethane rubber, having properties for preventing a fuel from leaking (see FIG. 8).

Figure 9:
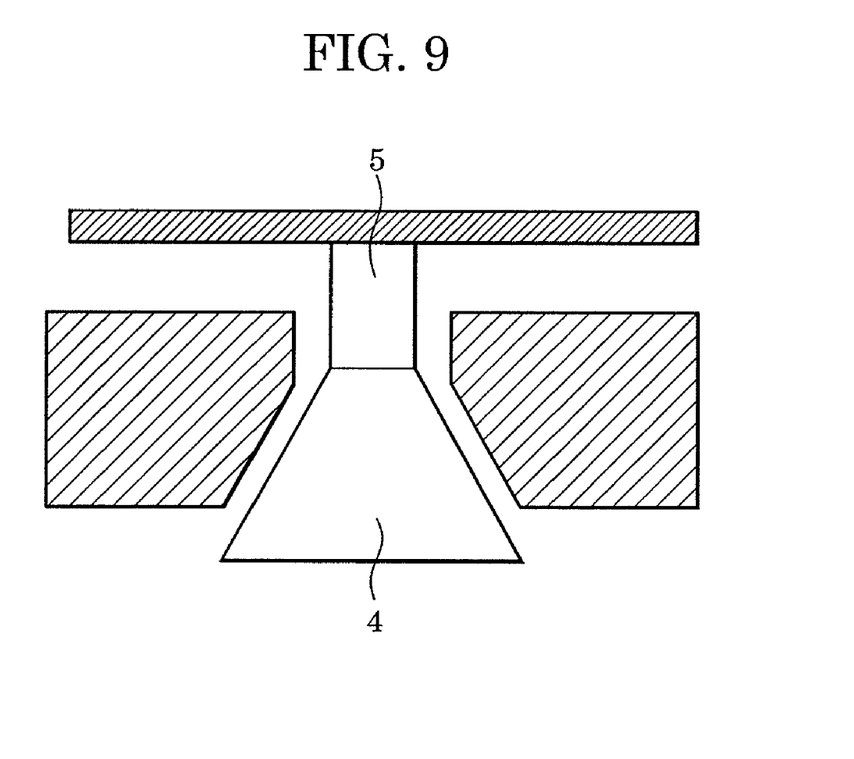
FIG. 9 is a view for illustrating the state in which a valve element and a shaft hole of a valve according to the present invention each have a tapered shape and are to be in contact with each other.
Figure 10:
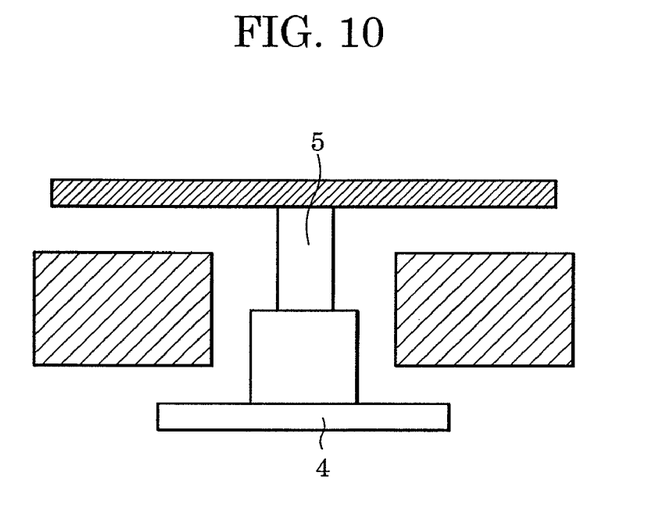
FIG. 10 is a view for illustrating the state in which the diameter of a valve shaft of a valve according to the present invention is changed in a stepwise manner.

Furthermore, as for the shape of the valve, when the shape as shown in FIG. 1 is formed, since the resistance at a throttle portion is not changed even when the degree of the opening of the valve is changed, the flow rate of the fluid is difficult to control in a stepwise manner, and as a result, problems may arise in some cases in that the valve must be frequently closed since the flow rate is excessively large or in that a sufficient, flow rate cannot be obtained. Accordingly, in order to decrease a flow-path resistance at the valve portion as the valve is opened, the valve element and the valve shaft hole may each be formed to have a tapered shape as shown in FIG. 9, or the valve shaft 5 may be formed to have different diameters along the longitudinal direction as shown in FIG. 10. The shape of the valve element may be variously changed in accordance with applications and working processes, that is, for example, in consideration of the type of fluid and the workability.

EXAMPLE

Hereinafter, the present invention will be described in detail with reference to the case in which the valve of the present invention is applied to a small fuel cell. However, the present invention is not limited to the small fuel cell.

Figure 11:
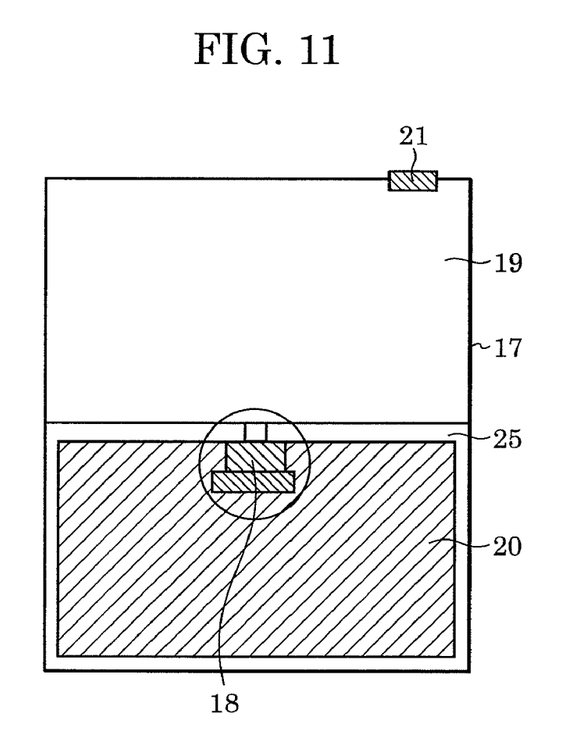
FIG. 11 is a schematic cross-sectional view showing a fuel cell of an embodiment according to the present invention.

As an effective example of the valve according to the present invention, the case will be described in which the valve of the present invention is used for a small fuel cell which is mounted in an electrical device such as a portable device. FIG. 11 is a schematic view showing the case in which the valve of the present invention is applied to a fuel cell. A fuel cell 17 is composed of a power generation portion 19, a hydrogen storage container 20 having a hydrogen absorbing alloy, a valve 18, and an exhaust valve 21. In this fuel cell, the valve 18 is provided at a connection portion 25 between the power generation portion 19 and the hydrogen storage container 20, and the exhaust valve 21 is provided for the power generation portion 19.

Figure 12:
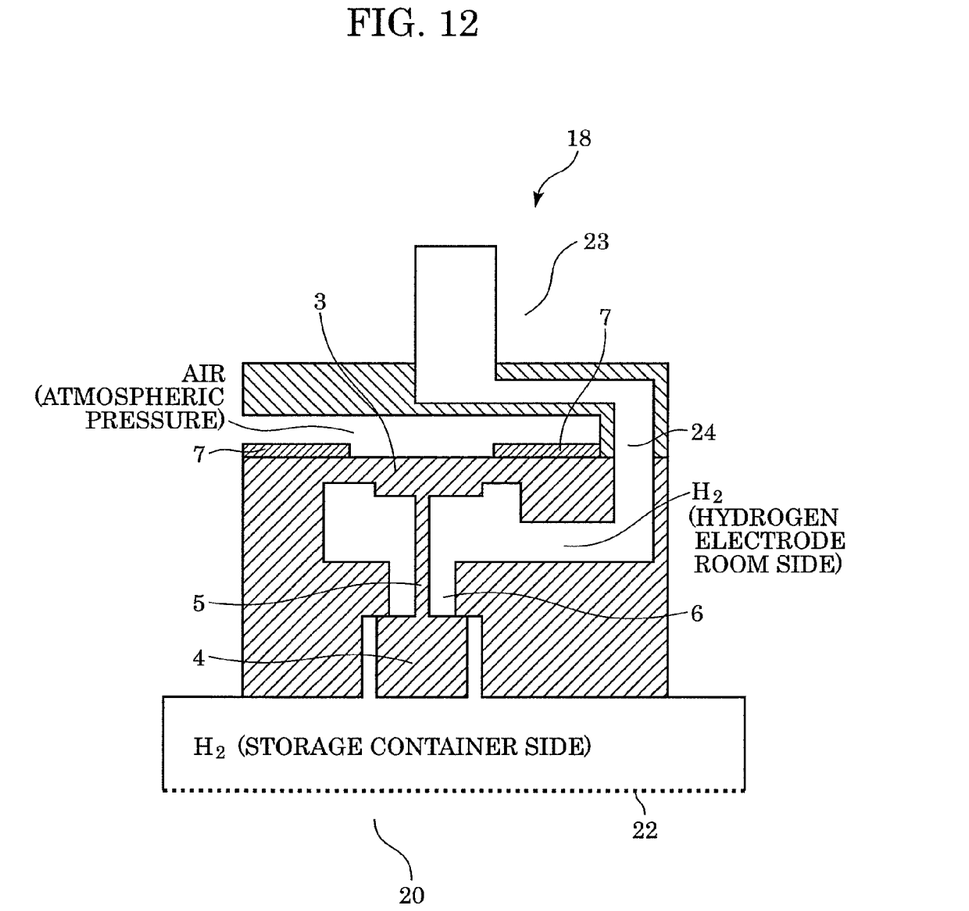
FIG. 12 is a cross-sectional view showing a valve of the present invention which is used for a fuel cell.

The valve 18 has the structure as shown in FIG. 12, an outside 23 of a flow path is atmosphere, and a hydrogen gas is allowed to flow through an inside 24 of the flow path. In addition, between the valve portion and the hydrogen storage container 20, a filter 22 is provided so as to prevent a powdered material of the hydrogen absorbing alloy from entering the valve 18.

According to the structure described above, in normal operation of the fuel cell 17 described above, the pressure regulation is carried out in accordance with the difference in pressure among the air, the hydrogen inside the flow path, and the hydrogen storage container 20. When the concentration of impurity gases in a hydrogen electrode room (not shown) is increased, and the output of the fuel cell is decreased, the valve is forcedly opened using the actuators 7 to supply a highly pressurized hydrogen gas in the hydrogen storage container 20 into the hydrogen electrode room of the power generation portion 19, and the impurity gases are then discharged outside through the exhaust valve 21, so that the inside of the hydrogen electrode room is purged with a hydrogen gas.

Hereinafter, the mechanism of the pressure regulation of the fuel cell described above will be described. When the valve is closed as shown in FIG. 12, the relationship represented by the following equation (1) as described above holds, and the pressure $P_2$ of the hydrogen electrode room is maintained at approximately atmospheric pressure.

$$(P_1 \times S_1) + \{P_2 \times (S_3 - S_4)\} > \{P_2 \times (S_2 - S_4)\} + (P_3 \times S_3) \quad (1)$$

However, when the pressure $P_2$ of the hydrogen electrode room is decreased as the hydrogen therein is used for the power generation performed in the fuel cell 17, by the relationship among $S_1$, $S_2$, $S_3$, $S_4$, $P_1$, $P_2$, and $P_3$, a force applied to the diaphragm 3 is increased so as to push the valve element downward, that is, so as to open the valve, and the diaphragm 3 is lowered by x [m] until the following equation (2) as described above holds.

$$(P_1 \times S_1) \pm \{P_2 \times (S_3 - S_4)\} + kx > \{P_2 \times (S_1 - S_4)\} + (P_3 \times S_3) \quad (2)$$

Subsequently, a hydrogen gas is again allowed to flow into the hydrogen electrode room from the hydrogen storage container 20, and when the pressure $P_2$ is increased so that the equation (1) holds, the valve is again closed, thereby regulating the pressure of the hydrogen electrode room.

Next, a purging mechanism will be described. By applying a force represented by the equation (3) described above to the diaphragm using the actuators, a highly pressurized hydrogen gas is supplied into the hydrogen electrode room, and a mixed gas composed of impurity gases and a hydrogen gas is discharged outside through the exhaust valve, thereby performing the purging. In this case, as electricity for driving the actuators, power generation energy of the fuel cell may be used and may be directly supplied therefrom, or in order to prevent an unstable supply of electricity from the fuel cell to a device side, electricity stored beforehand in a capacitor or a secondary cell may be used. In addition, the exhaust valve 21 may be passively opened and closed by the difference in pressure between the hydrogen electrode room and atmospheric pressure, and when a solid polymer membrane is used as an electrolyte of the fuel cell, in consideration of the strength of the membrane, a valve may be used which is opened at a pressure higher than atmospheric pressure by approximately 0.01 to 0.05 MPa.

In addition, when the temperature of the fuel cell 17 is increased, since the dissociation pressure of a hydrogen absorbing alloy is increased, the pressure $P_1$ of the hydrogen storage container 20 is increased. In this case, even when hydrogen in the hydrogen electrode room is used by the power generation of the fuel cell 17, and the pressure $P_2$ of the hydrogen electrode room is decreased, the valve cannot be passively opened, and as a result, the output of the fuel cell may be decreased in some cases. However, even in the case described above, by the use of the valve 18, when the decrease in output is detected, the valve can be actively opened by using the actuators, and hence shutdown of a device can be prevented which is caused by a large decrease in output.

In addition to the small fuel cell described above, for example, for a microreactor in which a flow path must be formed in a limited space, the valve of the present invention can be effectively used when purging of a fluid must be performed in a reaction system having one dead end.

As has thus been described, the valve of the present invention is a valve having a simple structure which can be easily miniaturized and having a pressure regulation mechanism which is unlikely to be degraded even when a corrosive fluid is allowed to flow therethrough. Hence, the valve described above can be applied, for example, to fuel cells, microreactors, and micro total analytical systems (μTAS).

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A valve comprising:
    a fluid inlet;
    a fluid outlet;
    a fluid flow path communicating the fluid inlet with the fluid outlet;
    a valve element provided in the fluid flow path;
    a diaphragm, which is disposed on a side of the fluid outlet of the fluid flow path as viewed from the valve element so as to separate an inside of the fluid flow path from an outside thereof and which is to be deformed by a difference in pressure between the inside of the fluid flow path and the outside thereof in a direction of the difference in pressure;
    a valve shaft connecting the valve element and the diaphragm; and
    an actuator provided for the diaphragm and disposed so as to deform the diaphragm, the actuator comprising at least one of a shape-memory alloy, a thermal expansion material, and an electromagnet,
    wherein the valve element is displaced by the deformation of the diaphragm, so as to open and close the valve.

2. The valve according to claim 1, wherein the actuator is provided for the diaphragm at the outside of the flow path.

3. The valve according to claim 1, wherein the diaphragm comprises a metal.

4. The valve according to claim 1, wherein the diaphragm comprises a nonmetallic material.

5. The valve according to claim 1, wherein the diaphragm comprises a semiconductor material.

6. The valve according to claim 1, wherein the valve element is displaced by the deformation of the diaphragm caused by the actuator so as to open and close the valve.

7. The valve according to claim 1, wherein the valve is displaced by the movement of the diaphragm so as to open and close the valve, and wherein the movement of the diaphragm is caused by deformation of the diaphragm resulting from the difference in pressure.

8. The valve according to claim 1, wherein the valve element has a tapered shape.

9. The valve according to claim 1, wherein the valve shaft is formed to have different diameters along the longitudinal direction.

10. The valve according to claim 1, wherein a cover is disposed on the actuator.

11. The valve according to claim 1, wherein a surface of the fluid flow path which comes into contact with the valve element is coated with a sealing material for preventing fuel leakage.

12. A fuel cell comprising:
a hydrogen storage container;
a hydrogen electrode chamber; and
a valve provided between the hydrogen storage container and the hydrogen electrode chamber, the valve comprising:
(a) a hydrogen inlet connected to the hydrogen storage container;
(b) a hydrogen outlet connected to the hydrogen electrode chamber;
(c) a hydrogen flow path communicating the hydrogen inlet with the hydrogen outlet;
(d) a valve element provided in the hydrogen flow path;
(e) a diaphragm, which is disposed on a side of the hydrogen outlet of the hydrogen flow path as viewed from the valve element so as to separate an inside of the hydrogen flow path from an outside thereof and which is to be deformed by a difference in pressure between the inside of the hydrogen flow path and the outside thereof in a direction of the difference in pressure;
(f) a valve shaft connecting the valve element and the diaphragm; and
(g) an actuator provided for the diaphragm and disposed so as to deform the diaphragm, the actuator comprising at least one of a shape-memory alloy, a thermal expansion material, and an electromagnet,
wherein the valve element is displaced by the deformation of the diaphragm, so as to open and close the valve.

13. The fuel cell according to claim 12, wherein the outside of the hydrogen flow path is the atmosphere.

14. The fuel cell according to claim 12, wherein the actuator is provided for the diaphragm at the outside of the hydrogen flow path.

15. The fuel cell according to claim 12, wherein the diaphragm comprises a metal.

16. The fuel cell according to claim 12, wherein the diaphragm comprises a nonmetallic material.

17. The fuel cell according to claim 12, wherein the diaphragm comprises a semiconductor material.

18. The fuel cell according to claim 12, wherein the valve element is displaced by the deformation of the diaphragm caused by the actuator so as to open and close the valve.

19. The fuel cell according to claim 12, wherein the valve element is displaced by the movement of the diaphragm so as to open and close the valve, and wherein the movement of the diaphragm is caused by deformation of the diaphragm resulting from the difference in pressure.

* * * * *